United States Patent
Lin et al.

(10) Patent No.: US 10,531,352 B2
(45) Date of Patent: Jan. 7, 2020

(54) CELL RE-SELECTION METHOD USED BY USER EQUIPMENT AND USER EQUIPMENT USING THE SAME

(71) Applicant: Acer Incorporated, New Taipei (TW)

(72) Inventors: Jung-Mao Lin, New Taipei (TW); Wei-Chen Pao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/885,847

(22) Filed: Feb. 1, 2018

(65) Prior Publication Data

US 2018/0227822 A1 Aug. 9, 2018

Related U.S. Application Data

(60) Provisional application No. 62/456,697, filed on Feb. 9, 2017.

(51) Int. Cl.
*H04W 36/30* (2009.01)
*H04W 36/00* (2009.01)

(52) U.S. Cl.
CPC ....... *H04W 36/30* (2013.01); *H04W 36/0061* (2013.01)

(58) Field of Classification Search
CPC ..... H04W 36/30; H04W 36/00; H04W 48/16; H04W 36/0061
See application file for complete search history.

(56) References Cited

U.S. PATENT DOCUMENTS

| | | |
|---|---|---|
| 5,920,818 A | 7/1999 | Frodigh et al. |
| 2003/0224790 A1 | 12/2003 | Choi |
| 2009/0017830 A1* | 1/2009 | Chater-Lea ............. H04W 4/12 455/446 |
| 2013/0090115 A1* | 4/2013 | Deivasigamani ..... H04W 48/20 455/434 |
| 2015/0223126 A1* | 8/2015 | Jung ..................... H04W 36/04 455/444 |
| 2016/0165501 A1* | 6/2016 | Ishida ............... H04W 36/0083 455/438 |
| 2016/0255576 A1* | 9/2016 | Jiang ..................... H04W 48/20 455/434 |
| 2017/0245121 A1* | 8/2017 | Jung ........................ H04W 4/06 |

FOREIGN PATENT DOCUMENTS

| | | |
|---|---|---|
| EP | 2894906 | 7/2015 |
| WO | 2016068662 | 5/2016 |

OTHER PUBLICATIONS

"Search Report of Europe Counterpart Application", dated Jun. 8, 2018, p. 1-p. 15.

* cited by examiner

*Primary Examiner* — Minjung Kim
(74) *Attorney, Agent, or Firm* — JCIPRNET

(57) ABSTRACT

The disclosure is directed to a cell re-selection method used by a user equipment and a user equipment using the same method. In an aspect, the disclosure is direct to a cell re-selection method which is used by a user equipment and includes obtaining a recommended cell list; storing one or more first cells after a signal quality measurement; determining a second cell from the first cells based on the signal quality measurement; determining whether the second cell belongs to the recommended cell list; and performing cell reselection to the second cell in response to having determined that the second cell belongs to the recommended cell list.

8 Claims, 13 Drawing Sheets

CELL RE-SELECTION METHOD USED BY USER EQUIPMENT AND USER EQUIPMENT USING THE SAME

CROSS-REFERENCE TO RELATED APPLICATION

This application claims the priority benefit of U.S. provisional application Ser. No. 62/456,697, filed on Feb. 9, 2017. The entirety of the above-mentioned patent application is hereby incorporated by reference herein and made a part of this specification.

TECHNICAL FIELD

The disclosure is directed to a cell re-selection method used by a user equipment and a user equipment using the same method.

BACKGROUND

A network may configure a set of recommended cells for a user equipment (UE) in the case the UE may move among different areas. Thus, a UE may need to perform cell selection or re-selection procedures. For example, a network may configure a set of cells or areas such as radio access network (RAN) based paging area or RAN notification area for a connected UE or an inactive UE when the UE performs a cell selection or re-selection procedure due to the UE mobility. A network may also provide a set of cells that provide Multimedia Broadcast Multicast Services (MBMS) service by Single Cell Point-to-Multipoint (SC-PTM) for MBMS service continuity purposes. The recommended set of cells may include one or more sets of cells information such as RAN notification area, MBMS, SCPTM, and so forth for different purposes.

For a New Radio (NR) communication system, a service based cell re-selection procedure has been adopted. However, the exact mechanism as for how to maintain service continuities for certain services has not been determined. Also, it has been determined that a NR communication system would support inter-frequency service based cell re-selection mechanism. However, which services would apply this mechanism has not been determined. Further, in the current LTE, the service based cell re-selection could be supported by sidelink communication, V2X sidelink communication, MBMS Service, and MBMS Service via SC-PTM reception. But for the intra-frequency service based cell re-selection mechanism, it is unclear whether such service could be supported by all cells that operate at the same frequency.

If a wireless communication service could be more flexibly and effectively provided, utilization of radio resources could be increased. For instance, utilization of radio resources could be increased if the granularity of the MBMS service via SC-PTM could be per cell and not the whole SFN. Without intra-frequency service based cell re-selection, service continuities could be difficult to maintain. For instance, if a neighboring cell that could provide a wireless service is not the best cell, then service continuities might not be maintained. If an idle UE receives MBMS via SC-PTM, then the idle UE may need to return to a connected mode in order to request the wireless service. If the idle UE intends to perform (V2X) sidelink communication, then the idle UE may need to become a synchronization source. To support intra-frequency service based cell re-selection, a UE may need to prioritize some cells based on recommended information in the cell re-selection scheme.

A UE may perform a cell re-selection process by obtaining at least frequency priority information such as a re-selection priority from a network. The re-selection priority may be used to limit required measurements or to find a best cell. When a UE performs measurements because of a reselection process has been trigger due to, for example, UE mobility, the UE may follow the existing rules to limit required measurements in a LTE system.

FIG. 1 illustrates a current cell re-selection process. It is worth noting that in the current cell re-selection process, a UE may not need to prioritize some cells. High level criterions of current cell re-selection process would depend on frequency priority, radio link quality, or cell accessibility. Referring to FIG. 1, in step S101, the UE would perform a frequency priority configuration which could be used as re-selection priority for prioritizing signal measurement. In step S102, the UE would measure a signal quality of a frequency so as to measure a cell's signal quality. In step S103, the UE would attempt to find a potential best cell or candidate cell based on the measured signal quality. For example, a UE may find the best cell by measuring each cell and by determining whether the measured cell would satisfy a selection condition. For cells that would satisfy the selection condition, the cells would be ranked based on the cells' signal quality.

A UE may choose not to perform intra-frequency measurements when the serving cell's radio link quality is greater than a threshold. For an inter-frequency with a re-selection priority higher than the re-selection priority of the current frequency, the UE will perform measurements of higher priority inter-frequency. For an inter-frequency with an equal or lower re-selection priority than the re-selection priority of the current frequency, if the serving cell's radio link quality is greater than a threshold, the UE may choose not to perform measurements of the inter-frequencies. For each measured cell, the UE may calculate a criterion S value based on the measured signal quality. If a measured cell's criterion S value has fulfilled a re-selection condition, the UE would further calculate a criterion R value for the cell. For example, the selection condition may be the criterion S value>0. After the measurement, the UE may get a list of cells that fulfill the selection condition. After step S103, the UE would then choose a cell with the biggest criterion R value, operates at the highest re-selection priority frequency, and is not marked as restricted or barred as a best cell.

In step S104, the UE would check whether the best cell that has been determined is restricted or barred. For the best cell, the UE may check whether the best cell is restricted or barred by reading the system information. Once the best cell is restricted or barred, the UE will mark the cell as restricted or barred and re-find a best cell. The status of the best cell with regard to whether the cell has been restricted or barred can be located in system information which has been broadcasted or transmitted. If the status of the best cell is 'not barred' and 'not reserved', then this cell would be treated as a candidate cell. For this step, the UE would need to read the system information block (SIB) within the system information. In step S105, if the best cell has been marked as 'barred' and 'reserved', then the best cell would not be regarded as a candidate cell, and step S104 would be repeated.

Next, in step S106, the UE would check whether the candidate cell would satisfy the re-selection conditions. If the best cell is not restricted or barred after checking system information, the best cell will be treated as a candidate cell.

When the UE finds the candidate cell, the UE would verify whether the re-selection conditions have been fulfilled. The re-selection conditions which may include whether the candidate cell is better ranked than the current serving cell during a time interval and whether more than one second has elapsed after the UE has camped on the current serving cell. If the re-selection conditions have been satisfied, then the UE would continue in step S107 by connecting to the candidate cell. If no best cell was found, the UE would repeat step S102 and continue to perform measurements accordingly.

It should be noted that the NR, the cell re-selection mechanism could be refined. It could be seen from FIG. 1 and its corresponding description that the re-selection scheme does not include prioritizing certain cells based on recommended information.

SUMMARY OF THE DISCLOSURE

The disclosure is directed to a cell re-selection method used by a user equipment and a user equipment using the same method.

In one of the exemplary embodiments, the disclosure is directed to a cell re-selection method used by a user equipment, and the method would include not limited to: obtaining a recommended cell list; storing one or more first cells after a signal quality measurement; determining a second cell from the first cells based on the signal quality measurement; determining whether the second cell belongs to the recommended cell list; and performing cell reselection to the second cell in response to having determined that the second cell belongs to the recommended cell list.

In one of the exemplary embodiments, the disclosure is directed to a user equipment which would include not limited to: a transceiver; and a processor coupled to the transceiver and configured to: obtain a recommended cell list; store one or more first cells after a signal quality measurement; determine a second cell from the first cells based on the signal quality measurement; determine whether the second cell belongs to the recommended cell list; and perform cell reselection to the second cell in response to having determined that the second cell belongs to the recommended cell list.

In one of the exemplary embodiments, the disclosure is directed to a cell re-selection method used by a user equipment, and the method would include not limited to: obtaining a recommended cell list; storing one or more cells after performing a signal quality measurement and a cell specific information acquisition; establishing a first cell list, wherein the first cell list comprises a signal quality and a cell specific information for each of the cells resulted from the signal quality measurement and the cell specific information acquisition; calculating a value for each of cells in the first cell list based on the signal quality resulted from the signal quality measurement; determining whether there is at least one cell that is in both the first cell list and the recommended cell list; selecting a second cell from the at least one cell in response to having determined that there is at least one cell that is in both the first cell list and the recommended cell list; and performing cell reselection to the second cell. In one of the exemplary embodiments, the disclosure is directed to a user equipment which would include not limited to: a transceiver; and a processor coupled to the transceiver and configured to: obtain a recommended cell list; store one or more cells after performing a signal quality measurement and a cell specific information acquisition, establish a first cell list, wherein the first cell list comprises a signal quality and a cell specific information for each of the cells resulted from the signal quality measurement and the cell specific information acquisition; calculate a value for each of cells in the first cell list based on the signal quality resulted from the signal quality measurement; determine whether there is at least one cell that is in both the first cell list and the recommended cell list; select a second cell from the at least one cell in response to having determined that there is at least one cell that is in both the first cell list and the recommended cell list; and; perform cell reselection to the second cell. In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
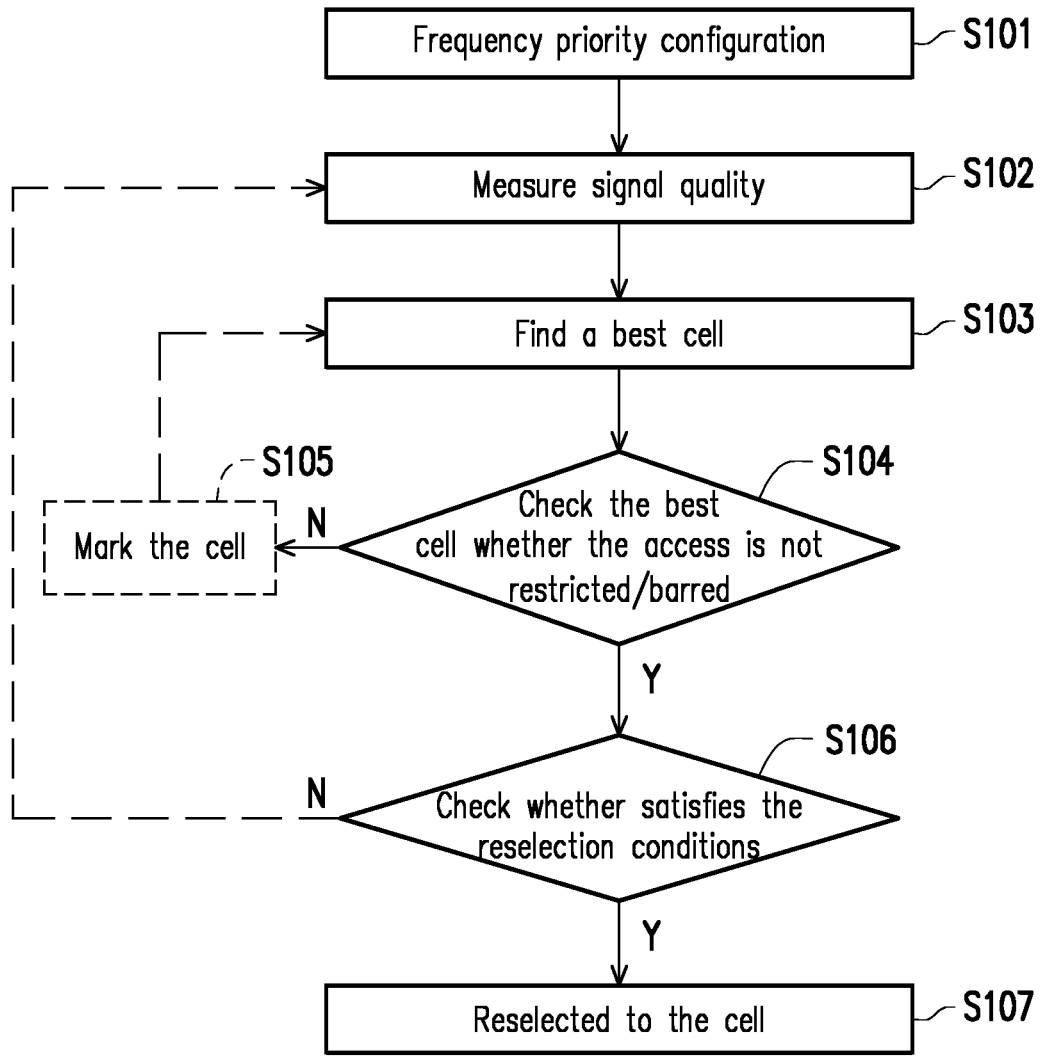
FIG. 1 illustrates a cell re-selection process.

Reference will now be made in detail to the present exemplary embodiments of the disclosure, examples of which are illustrated in the accompanying drawings. Wherever possible, the same reference numbers are used in the drawings and the description to refer to the same or like parts.

As previously described, although the current cell reselection procedure acquires information of cells through measurements, it does not factor in recommended information about a cell for determining a best cell for cell re-selection. The disclosure provides a mechanism for an UE to take recommended cells into consideration when the UE the performs cell re-selection due to device mobility. The provided mechanism may include adding a checking function to be performed on acquired best cell's specific information. The UE may then evaluate or compare the acquired information of each cell sequentially. For example, a UE may only try to verify, based on the recommended information, a best cell to see whether the best cell belongs to recommend cells. The UE may not need to verify all measured cells to see whether these cells belong to recommend cells based on the recommend information. Alternatively, the UE may utilize a modified measurement rule and ranking method which are used based on acquired best cell's specific information. The UE would then evaluate or compare the acquired information of each cell in a batch mode. For example, an UE may try to verify all measured cells to see whether the measured cells belong to recommend cells based on the recommend information. The concepts of the disclosure are further elucidated in FIG. 2 and FIG. 3 and their corresponding written descriptions.

Figure 2A:
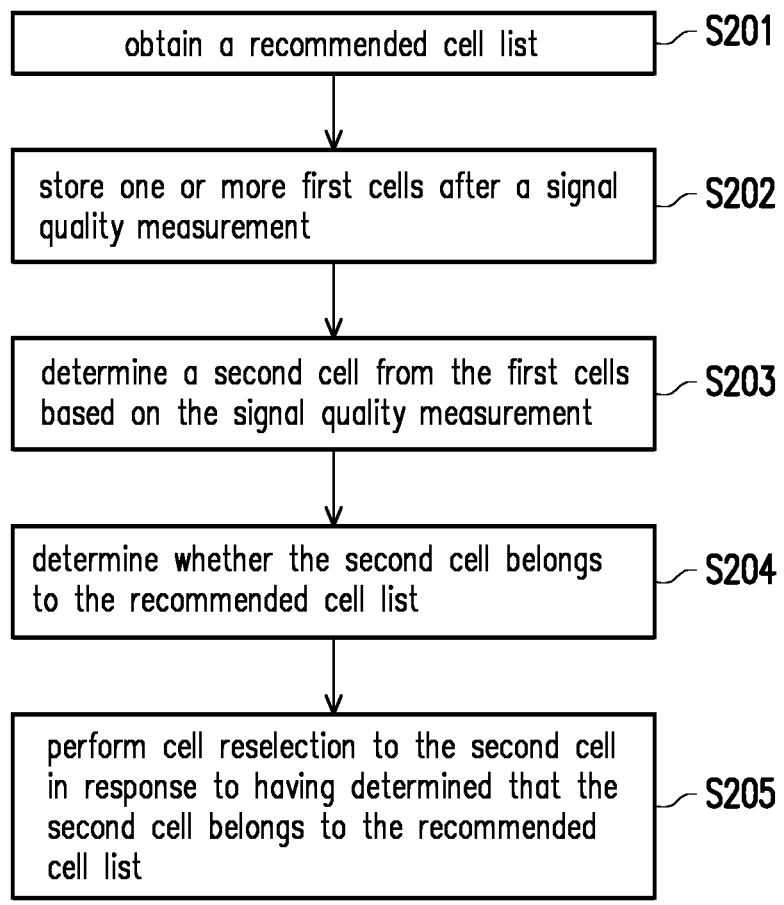
FIG. 2A illustrates a cell re-selection method used by a user equipment in accordance with one of the exemplary embodiments of the disclosure.

FIG. 2A illustrates a cell re-selection method used by a user equipment in accordance with one of the exemplary embodiments of the disclosure. In step S201, the UE would obtain a recommended cell list. In step S202, the UE would store one or more first cells after a signal quality measurement. In step S203, the UE would determine a second cell from the first cells based on the signal quality measurement. In step S204, the UE would determine whether the second cell belongs to the recommended cell list. In step S205, the UE would perform cell reselection to the second cell in response to having determined that the second cell belongs to the recommended cell list.

In various exemplary embodiments, the UE may mark the second cell as being unavailable for a T duration in response to having determined that the second cell does not belong to the recommended cell list and determine another second cell from the first cells based on the signal quality measurement. Performing cell reselection to the second cell may include determining whether the second cell can be reselected to based on a signal quality condition of the second cell and a status of the second cell and reselecting to the second cell in response to having determined that the second cell can be reselected to. Determining a second cell from the first cells based on the signal quality measurement may include calculating a value for each of the first cells in response to performing the signal quality measurement and determining the second cell from the first cells based on the value.

In an exemplary embodiment, the second cell is not marked as being unavailable for T duration, but the second cell is marked as being unavailable for T duration in response to having determined that no cell resulted from the signal quality measurement is on the recommended cell list. Determining whether the second cell belongs to the recommended cell list may include obtaining an identity of the second cell and determining whether the identity of the second cell matches in the recommended cell list. The identity of the second cell could be any one of a Physical layer Cell Identity (PCI), a Cell Global Identifier, a Cell Identifier (ID), an area code, and a supported service information identity. Obtaining the recommended cell list may include obtaining the recommended cell list from a network node or obtaining the recommended cell list from a storage medium within the user equipment.

Figure 2B:
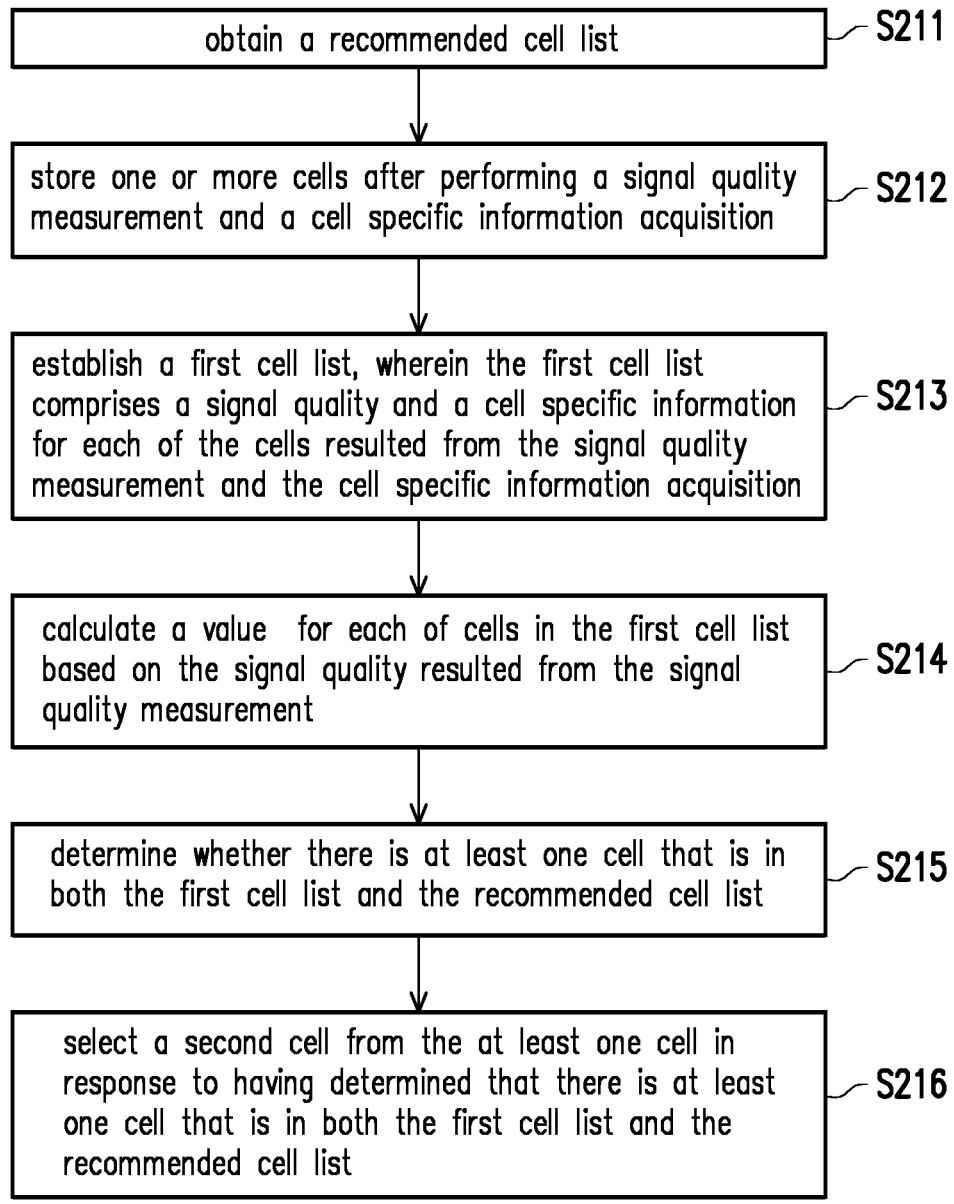
FIG. 2B illustrates a cell re-selection method used by a user equipment in accordance with one of the exemplary embodiments of the disclosure.

FIG. 2B illustrates a cell re-selection method used by a user equipment in accordance with one of the exemplary embodiments of the disclosure. In step S211, the UE would obtain a recommended cell list. In step S212, the UE would store one or more cells after performing a signal quality measurement and a cell specific information acquisition. In step S213, the UE would establish a first cell list, wherein the first cell list comprises a signal quality and a cell specific information for each of the cells resulted from the signal quality measurement and the cell specific information acquisition. In step S214, the UE would calculate a value for each of cells in the first cell list based on the signal quality resulted from the signal quality measurement. In step S215, the UE would determine whether there is at least one cell that is in both the first cell list and the recommended cell list. In step S216, the UE would select a second cell from the at least one cell in response to having determined that there is at least one cell that is in both the first cell list and the recommended cell list In one of the exemplary embodiments, selecting the second cell from the at least one cell in response to having determined that there is at least one cell that is in both the first cell list and the recommended cell list may include: comparing the recommended cell list and the first cell list to generate a third cell list which comprises at least one cell that is in both the recommended cell list and the first sorted cell list; and determining the second cell from the third cell list based on the value. In response to having determined that there is no cell that is in both the first sorted cell list and the recommended cell list, the UE may further determine whether the signal quality of a current serving cell of the user equipment is greater than a predetermined threshold, discard the first list in response to having determined that the signal quality of a current serving cell of the user equipment is greater than a predetermined threshold, and select the second cell based on the value from the first cell list in response to having determined that the signal quality of the current serving cell of the user equipment is no greater than a predetermined threshold.

In one of the exemplary embodiments, the UE determining whether there is at least one cell that is in both the first cell list and the recommended cell list may further include: generating a fourth cell list from the first cell list to contain only one or more cells that are also in the recommended cell list; and generating a fifth cell list from the first cell list to contain one or more cells that are in the first cell list but not in the recommended cell list. In response to having determined that there is not at least one cell in the fourth cell list, the UE may further determine whether a signal quality of a current serving cell of the user equipment is greater than a predetermined threshold, discard the first cell list, the fourth cell list and the fifth cell list in response to having determined that the signal quality of the current serving cell of the user equipment is greater than a predetermined threshold, and select a second cell from the fifth cell list based on the value in response to having determined that the signal quality of the current serving cell of the user equipment is no greater than a predetermined threshold.

The cell specific information of the one or more cells may include at least one of a Physical layer Cell Identity (PCI), a Cell Global Identifier, a Cell Identifier (ID), an area code, and a supported service information identity. Performing cell reselection to the second cell may include determining whether the second cell can be reselected to based on a signal quality condition of the second cell and a status of the second cell and reselecting to the second cell in response to having determined that the second cell can be reselected to. The recommended cell list could be one of a list of cell identifiers (IDs), a list of codes, and a list of service IDs. Determining whether there is at least one cell that is in both the first cell list and the recommended cell list is by determining whether the cell specific info nation matches the recommended cell list.

Figure 3:
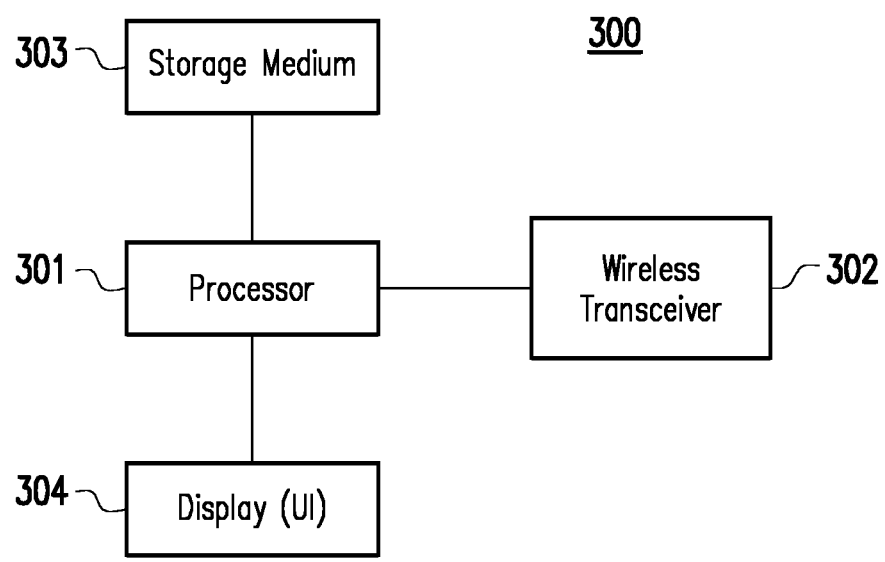
FIG. 3 illustrates the hardware block diagram of a user equipment in accordance with one of the exemplary embodiments of the disclosure.

FIG. 3 illustrates the hardware block diagram of a user equipment in accordance with one of the exemplary embodiments of the disclosure. The term UE in this disclosure could be a mobile station, an advanced mobile station (AMS), a server, a client, a desktop computer, a laptop computer, a network computer, a workstation, a personal digital assistant (PDA), a tablet, a personal computer (PC), a scanner, a (smart) telephone device, a watch, a pager, a camera, a television, a hand-held video game device, a musical device, a wireless sensor, a drone, and the like. In some applications, a UE may be a fixed computer device operating in a mobile environment, such as a bus, a train, an airplane, a boat, a car, and so forth.

The structure of the UE would include not limited to a processor 301 coupled to a transmitter and/or receiver (transceiver) 302, a storage medium 303, and optionally a user interface (UI) 304 which may or may not contain a display 305. The transmitter and/or receiver 302 are controlled by the processor 301 to down-convert radio frequency signals (RF) (or millimeter wave signals) received from an antenna (array) into baseband signals to be processed by the processor 301 and are controlled by the processor 301 to up-convert baseband signals into RF or millimeter wave signals to be transmitted through the antenna (array). The transmitter and/or receiver 302 may also include one or more sets of hardware tuned to different frequency bands such as RF frequency, millimeter frequency, Bluetooth frequency, WiFi frequency, and so forth. The storage medium 303 contains temporary and/or permanent storage medium for storage of temporarily buffered data or for permanent (non-volatile) data storage. The processor 301 would include one or more hardware processing units such as processors, controllers, or discrete integrated circuits to implement the disclosed method of re-selecting a cell and all the exemplary embodiments in this disclosure.

Figure 4:
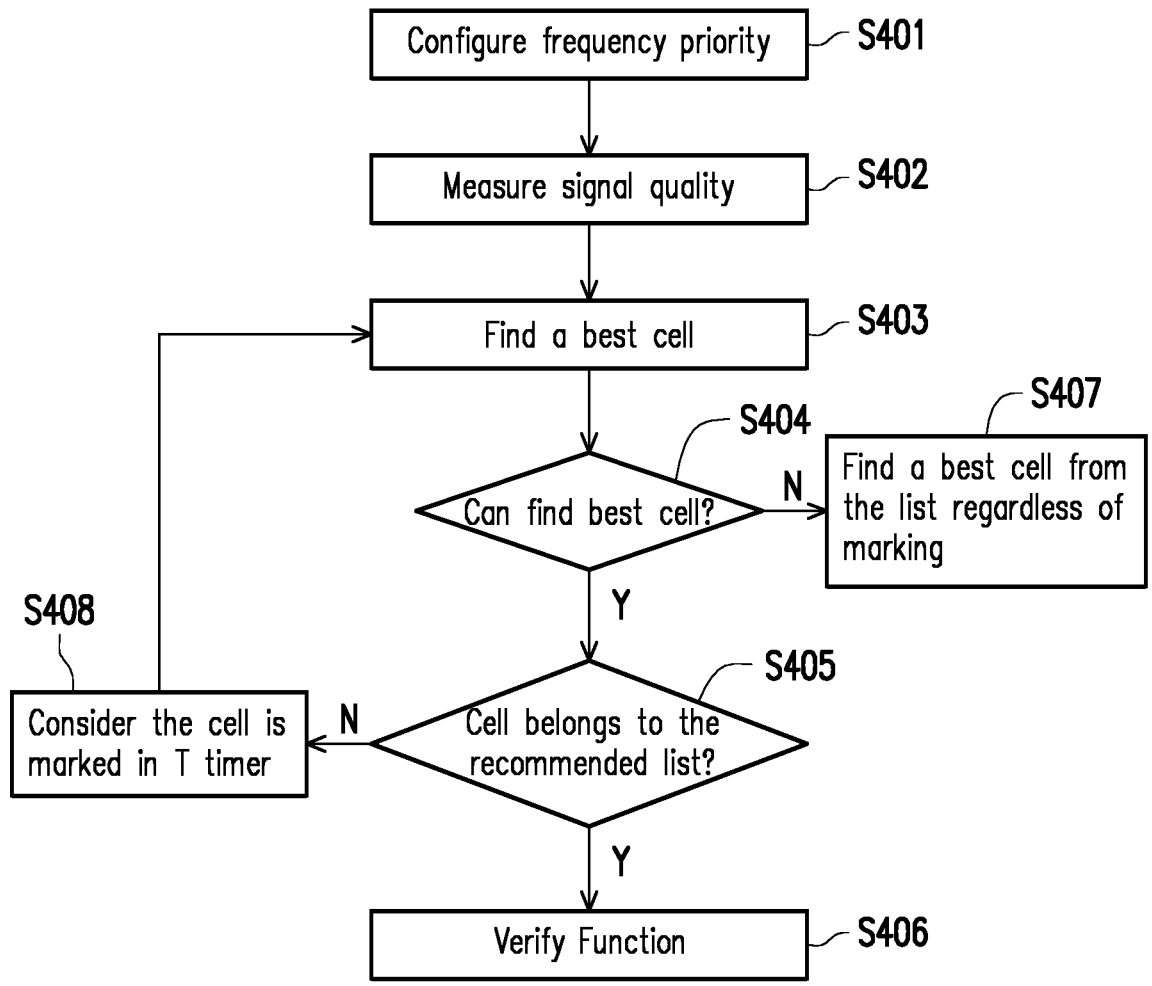
FIG. 4 illustrates a cell re-selection method used by a user equipment with a modified checking function in accordance with one of the exemplary embodiments of the disclosure.
Figure 5:
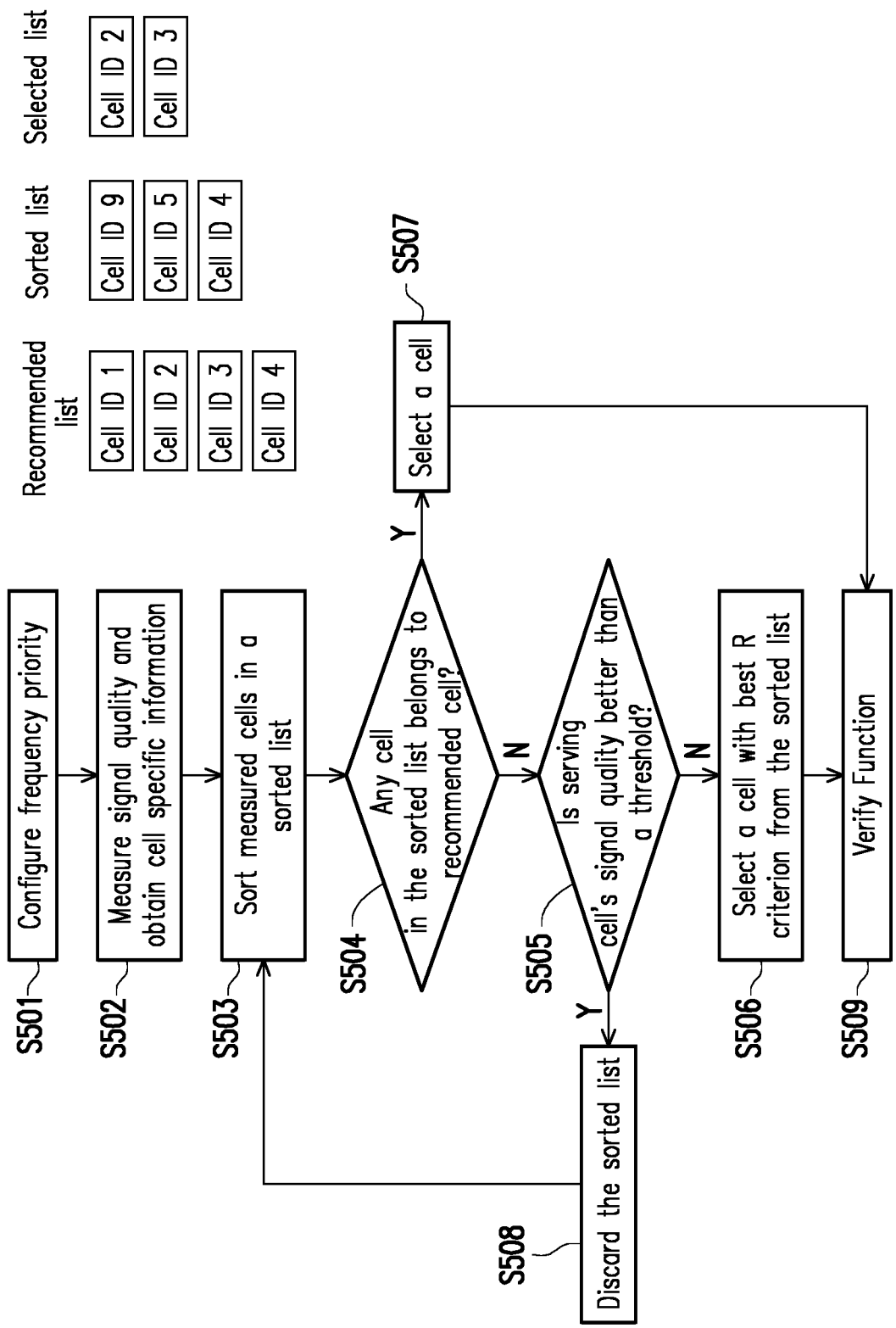
FIG. 5 illustrates a cell re-selection method used by a user equipment with a modified measurement rule and ranking technique in accordance with one of the exemplary embodiments of the disclosure.
Figure 6:
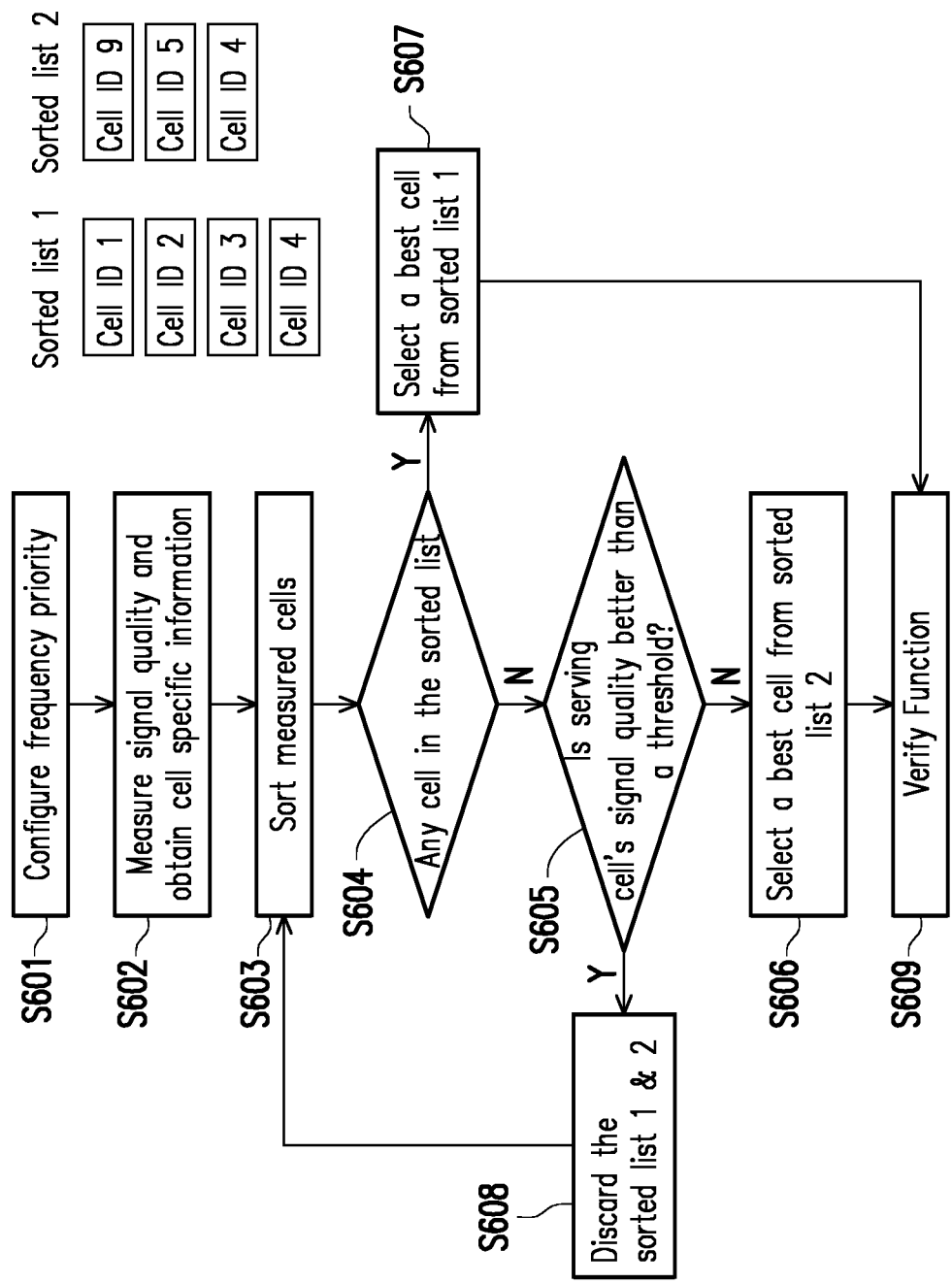
FIG. 6 illustrates an alternative to the cell re-selection method used by a user equipment with a modified measurement rule and ranking technique of FIG. 6 in accordance with one of the exemplary embodiments of the disclosure.

FIG. 4~FIG. 6 their corresponding written descriptions further expanded upon the concepts of the disclosure. FIG. 4 illustrates a cell re-selection method used by a user equipment with a modified checking function (e.g. S404, S405, S407, S408) in accordance with one of the exemplary embodiments of the disclosure. FIG. 4 would be applicable to a UE which performs a cell re-selection due to UE mobility or other causes. In step S401, the UE would perform the step of configuring frequency priority. In this step, the UE may receive one or more recommended cells configured by a network node. In this step, the UE may also get a priority for a list of frequencies as well as an advanced cell re-selection parameter such as a timer T from the network node. Based on the received information from the network node, the UE may set the frequencies of the recommended cells as cells having the highest re-selection priorities.

In step S402, the UE would detect or measure signal qualities of a plurality of nearby cells. After measurement or detection, the UE may maintain a list of at least one cell which has a measured signal quality. If no cell has been found for conducting measurement, the UE may keep detecting for nearby cells and performing measurements.

In step S403, the UE determine a best cell among the cells that have been detected and measured. For example, the best cell could be determined, for example, based on a cell having highest criterion R value. To be more specific, for each cell which has been measured, the UE may then have the measured signal quality for each cell. For each measured cell, the UE may calculate a criterion S value based on the measured signal quality. If the measured cell's criterion S value has satisfied a re-selection condition, the UE may further calculate a criterion R value for the cell. For example, the selection condition may be the criterion S value>0. After UE have compiled a list of cells that fulfill the selection condition, the may choose a cell with the biggest criterion R value. The cell would be a cell that operates at the frequency which is among the highest re-selection priority, and the cell is not marked as restricted or barred. If the UE in step S403 does not find any cell that satisfy the re-selection condition, then the UE may keep performing measurements and the subsequent calculations. Based on the above described criterion R and re-selection priority, the UE may obtain a best cell from the complied cell list.

In step S404, the UE determines whether the best cell has been found. If the UE cannot find a best cell from the cell list, the UE may find a best cell from the previously compiled list of cells that fulfilled the selection condition. Also, the best cell should not be marked or barred. Assuming that in step S404 the UE has found the best cell, then in step S405, the UE would check whether the best cell belongs to the recommended list of cells. The recommended list of cells may contain a list of cell identifiers (IDs), a list of codes, or a list of service IDs. The step of checking whether a cell belongs to the recommended list may include checking a cell identity which could be, for example, physical-layer Cell identity (PCI), cell identity, or Cell a Global Identifier (CGI), checking a broadcasted area code which could be, for example, a paging area code, a notification area code, or a tracking area code, and/or checking a broadcasted supporting service information.

If the best cell belongs to the recommended cells, the in step S406, the UE would perform a verification function to check the cell status and the signaling quality of the best cell to ensure that the best cell could be connected to. Once verified, the UE would re-select the best cell as its camping cell. If the best cell does not belong to the recommended cells, then in step S408, the UE may mark the cell for a period of T and start timer to measure the period of T within which the cell would not be available for selection until the timer has expired. Also, the UE would repeat the step of re-selecting a new best cell from the compiled list of cells. Once the new best cell has been selected, in step S408, the UE would perform the verification function by checking the cell status and signaling quality to verify that the new best cell could be re-selected to. The new best cell should belong to the recommended list of cells. If the new best cell also does not belong to the recommended list of cells, then the UE may also mark the new best cell as being temporarily unavailable for a time interval T and repeating finding another best cell. If all cells in the recommended list of cells are marked as being unavailable, then UE would select a best cell from the compiled list of cells regardless the markings. If marking time T of a cell expires, then the cell could be reconsidered as the best cell.

FIG. 5 illustrates a cell re-selection method used by a user equipment with a modified measurement rule and ranking technique in accordance with one of the exemplary embodiments of the disclosure. The ranking technique would involve sorting measured cells according to the criterion R value, and the technique may take the serving cell's signal quality into consideration when the UE re-selects the best cell. Referring to FIG. 5, in step S501, the UE may obtain a priority level for each carrier frequency from a network node.

In step S502, the UE may measure the signal quality of each of nearby cells as well as obtaining cell specific information or cell identity of these cells. As the UE measures the signal quality of nearby cells, the UE would also determine whether the signal quality has satisfied a selection condition which could be, for example, the cell's criterion S>0. If a cell has satisfied the selection condition, the UE may calculate a criterion R value of the cell and also get a cell identity of the cell. The cell identity could be one of a Physical Cell Identifier (PCI) value, a Cell Global Identity (CGI), a network node code (e.g. paging area code, notification area code, or tracking area code) or a list of area code. Next, UE may compile a list of cells that has satisfied the selection condition with the criterion R value that corresponds to the cell. If the UE does not find any cell that would satisfy the selection condition, the UE may keep detecting nearby cells and performing signal quality measurements.

In step S503, based on the criterion R's of the cells in the compiled list of cells, the UE may sort the cells in the compiled list of cells and derived a sorted cell list. In step S504, the UE may determine whether any cell that belongs to the sorted cell list would also belong to the recommended listed of cells. The UE would match the sorted cell list and the recommended list of cells to find one or more common entities. The UE could then compile the common entities as a selected cell list. In the example provided in FIG. 5, assuming that the recommend list of cells includes Cell ID 1, Cell ID 2, Cell ID 3, and Cell ID 6 and the sorted list includes Cell ID 9, Cell ID 2, Cell ID4, and Cell ID 3, then the selected list would include Cell ID 2 and Cell ID 3 which are in common between the sorted list and the recommended list of cells. If the selected list is not empty, then, in step S507, the UE would select a best cell based on, for example, a cell that has the largest criterion R value from the selected list. In step S508, the UE would verify whether the best cell could be connected to by a verify function.

If the selected list is empty, in step S505, the UE would determine whether the signal quality of the current serving cell is higher than a threshold. If the signal quality of the current serving cell is higher than a threshold, then in step S508, the UE may discard the entire selected list and proceed from step S502. If the selecting list is empty and signal quality of serving cell is less than a threshold, then UE may select a best cell by, for example, selecting a cell with the biggest criterion R value from the sorted cell list and perform step S509 by verifying by a verify function whether the cell with the biggest criterion R value could be connected based on the cell status and signal quality.

FIG. 6 illustrates an alternative to the cell re-selection method used by a user equipment with a modified measurement rule and ranking technique of FIG. 6 in accordance with one of the exemplary embodiments of the disclosure. In step S601, the UE may obtain a priority level for each carrier frequency from a network node. In step S602, the UE may measure the signal quality of each of nearby cells as well as obtaining cell specific information or cell identity of these cells. As the UE measures the signal quality of nearby cells, the UE would also determine whether the signal quality has satisfied a selection condition which could be, for example, the cell's criterion S>0. If a cell has satisfied the selection condition, the UE may calculate a criterion R value of the cell and also get a cell identity of the cell. The cell identity could be one of a Physical Cell Identifier (PCI) value, a Cell Global Identity (CGI), a network node code (e.g. paging area code, notification area code, or tracking area code) or a list of area code. Next, UE may compile a list of cells that has satisfied the selection condition with the criterion R value that corresponds to the cell. If the UE does not find any cell that would satisfy the selection condition, the UE may keep detecting nearby cells and performing signal quality measurements.

In step S603, based on the criterion R's of the cells in the compiled list of cells, the UE may sort the cells in the compiled list of cells into a first sorted list and a second sorted list based on whether the cells in the compiled list of cells are also in the recommended list of cells. In other words, the UE would compare the compiled list of cells with the recommended list of cells to find one or more common entities. The UE could then compile the common entities as a first sorted list and the others in a second sorted list. In the example provided in FIG. 6, assuming that the recommend list of cells have been compared with the compiled list of cells to derive the first sorted list which includes Cell ID 1, Cell ID 2, Cell ID 3, and Cell ID 6 and the second sorted list which includes Cell ID 9, Cell ID 5, and Cell ID 4. It should be noted that in the example of FIG. 6 each of the first sorted list and the second sorted list have also be ranked based on the criterion R value.

In step S604, the UE would determine whether there is any cell in the first sorted list. If the first sorted list is not empty, then, in step S607, the UE would select a best cell based on, for example, a cell that has the largest criterion R value from the first sorted list. In step S608, the UE would verify whether the best cell could be connected to by a verify function.

If the selected list is empty, in step S605, the UE would determine whether the signal quality of the current serving cell is higher than a threshold. If the signal quality of the current serving cell is higher than a threshold, then in step S608, the UE may discard both the first sorted list and the second sorted list and proceed from step S602. If the first sorted list is empty and signal quality of serving cell is less than a threshold, then UE may select a best cell by, for example, selecting a cell with the biggest criterion R value from the second sorted cell list and perform step S509 by verifying by a verify function whether the cell with the biggest criterion R value could be connected based on the cell status and signal quality.

In this exemplary embodiment, the recommend list of cells which could be configured by a network node may include at least be a list of cell IDs, a list of codes, or a list of service IDs. The technique of determining whether a cell belongs to the recommended list of cells may include at least one of checking a cell identity which could be, for example, a physical-layer Cell identity (PCI), a cell identity, or a Cell Global Identifier (CGI), checking a broadcasted area code which could be, for example, paging area code, notification area code, or tracking area code, and/or checking a broadcasted supporting service information.

To further elucidated the above described concepts, the disclosure provides several exemplary embodiments. Embodiments in this disclosure may be applied to any events disclosed. The process or the order of event/signaling/messages in the disclosure are not limited to embodiments. Steps, including messaging and signaling, in the procedure may not be limited to the order in the disclosure. Each step/message/signaling may be inter-changeable in the procedures, may be implemented in any combination, or may be implemented independently.

Figure 7:
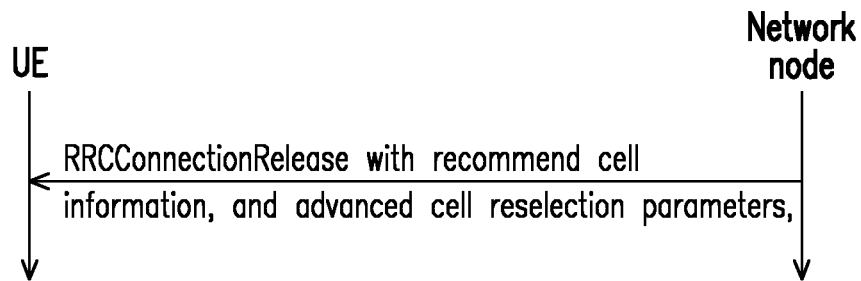
FIG. 7 illustrates a cell re-selection method used by a user equipment in accordance with a first exemplary embodiment of the disclosure.

FIG. 7 illustrates a cell re-selection method used by a user equipment in accordance with a first exemplary embodiment of the disclosure. Embodiment 1 shows a message between UE and network node. The message may be a unicast message (e.g. RRCConnectionRelease). This message could carry at least a recommended cell information and an advanced cell reselection parameters. The recommended cell information could be a RAN based paging area information or a notification area information. The RAN based paging area information or the notification area information could be at least a list of cell identity information and associated frequency information. The list of cell identity information could be a list of cell ID (e.g. Physical Cell Identifier (PCI), Cell Global Identity (CGI) . . . etc.), a list of network node code (e.g. paging area code, notification area code or tracking area code), or an area code. The RAN based paging area information or the notification area information could be used to identify whether a network node belongs to the RAN based paging area. The advanced cell reselection parameters could be at least an offset value, a marking time T, or a re-selection indicator that could be used to implement the disclosed cell re-selection procedure. The offset value and the marking time T could be cell specific. The offset value may be used to add to a cell's criterion R value, if the cell does not belong to recommend cells. The offset value could be used to de-prioritize a cell not belong to recommend cells. The marking time T may be used as a time interval for a cell to be marked. When the marking time T is expired, the marked cell will be de-marked. The re-selection indicator may also be used to indicate what kind of cell re-selection scheme is used by the UE.

Figure 8:
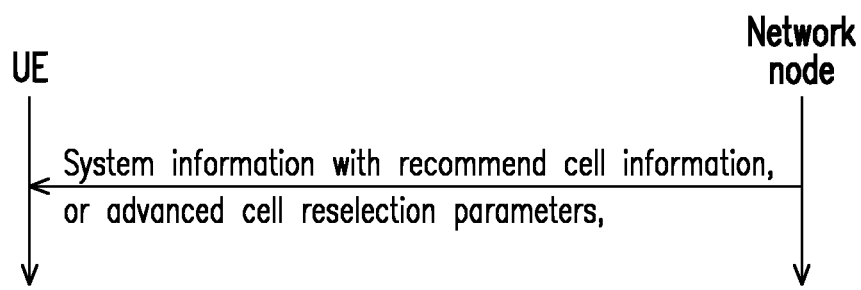
FIG. 8 illustrates a cell re-selection method used by a user equipment in accordance with a second exemplary embodiment of the disclosure.

FIG. 8 illustrates a cell re-selection method used by a user equipment in accordance with a second exemplary embodiment of the disclosure. The second exemplary embodiment shows messaging between a UE and a network node. The messaging could be a broadcast message such as a system information message. This message could carry at least a recommended cell information or cell re-selection parameters. The recommended cell information and the cell re-selection parameters could be carried in a same broadcast message or difference broadcast messages. The recommended cell information could be a RAN based paging area information, a notification area information, or a cell list with service information. The RAN based paging area information or the notification area information could be at least a list of cell identity information and the associated frequency information. The list of cell identity information could be a list of cell ID (e.g. Physical Cell Identifier (PCI), a Cell Global Identity (CGI) . . . etc.), a list of network node codes (e.g. paging area code, notification area code, or tracking area code), or an area code. The RAN based paging area information or the notification area information could be used to identify whether a network node belongs to the RAN based paging area. The cell list with service information could be at least a list of cell identity information and associated service information. The list of cell identity information could be a list of cell ID (e.g. Physical Cell Identifier (PCI), or Cell Global Identity (CGI) . . . etc.). The associated service information could be a list of service information (e.g. MBMS service information) that is provided by a corresponding cell in the cell list. The list of cell identity information and the associated service information could be mapped by a bit map. The cell list with service information is use to identify what services are provided at a cell in the corresponding cell list. The recommended cell information could be a RAN based paging area information, a notification area information, or a cell list with service information.

Figure 9:
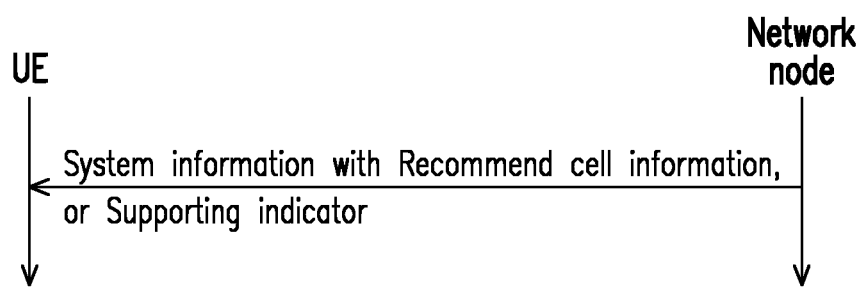
FIG. 9 illustrates a cell re-selection method used by a user equipment in accordance with a third exemplary embodiment of the disclosure.

FIG. 9 illustrates a cell re-selection method used by a user equipment in accordance with a third exemplary embodiment of the disclosure. The third exemplary embodiment shows messaging between a UE and a network node. The message could be a broadcast message (e.g. system information). This message could carry at least a recommended cell information or a supporting indicator. The recommended cell information and the supporting indicator could be carried in the same broadcast message or difference broadcast messages. The recommended cell information could be a cell ID (e.g. Physical Cell Identifier (PCI), Cell Global Identity (CGI) . . . etc.), a network node code (e.g. paging area code, notification area code, or tracking area code), or a list of area codes. The recommended cell information could be used to identify whether the network node belongs to the recommended cells. The supporting indicator could be used to indicator whether the network node supports a specific function. The specific function could be a least a light connection function or an inactive state function.

Figure 10:
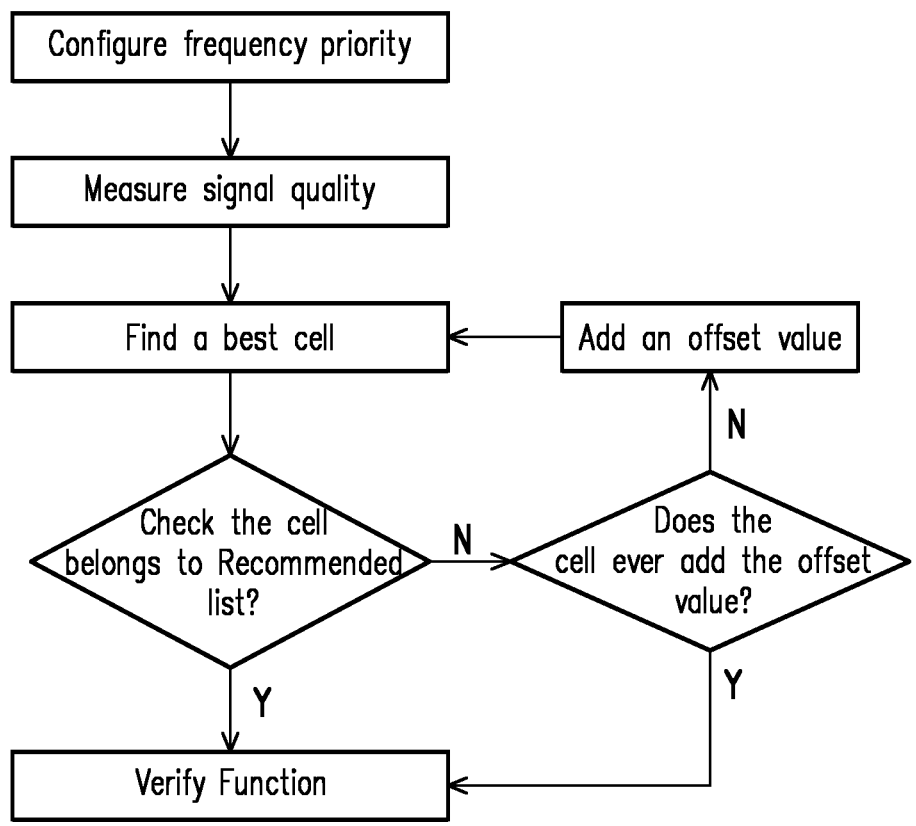
FIG. 10 illustrates a cell re-selection method used by a user equipment in accordance with a fourth exemplary embodiment of the disclosure.

FIG. 10 illustrates a cell re-selection method used by a user equipment in accordance with a fourth exemplary embodiment of the disclosure. The fourth exemplary embodiment shows a procedure of a UE performing a cell re-selection procedure. In this procedure, the UE could take a list of recommended cells configured by network node into consideration when performing the cell re-selection procedure. Also in this procedure, the UE may obtain information such as the priority level for each carrier frequency and cell re-selection parameters (e.g. an offset value, timer T, etc.) from a network node. Based on received information, the UE may perform the cell re-selection. The UE could set the frequencies that may contain the recommended cells with the highest re-selection priority. When the UE has detected and measures a cell that satisfy a selection condition (for example, the cell's criterion S>0), the UE may then calculate a criterion R for the cell. The UE may then compile a list of cells that has satisfied the selection condition after measurements. Once the UE does not find any cell satisfies the selection condition, the UE may keep performing measurement. Based on the criterion R and reselection priority, the UE will find a best cell (for example, a cell that has the biggest criterion R value, operates on the highest reselection priority frequency, and is not barred) from the cell list. If the UE cannot find a best cell from the cell list, the UE may keep performing measurement. The UE may check whether the best cell belongs to a list of recommended cells. If the best cell belongs to the list of recommended cells, then UE will verify whether the cell could be connected to by a verify function. If the best cell does not belong to the list of recommended cells and has never added an offset value, the UE would add the offset value to the cell's criterion R value and re-select a best cell from the cell list. If the best cell does not belong to the recommended cells but has already been added an offset value, then UE will verify whether the cell could be connected to by a verify function according to the cell status and signaling quality.

Figure 11:
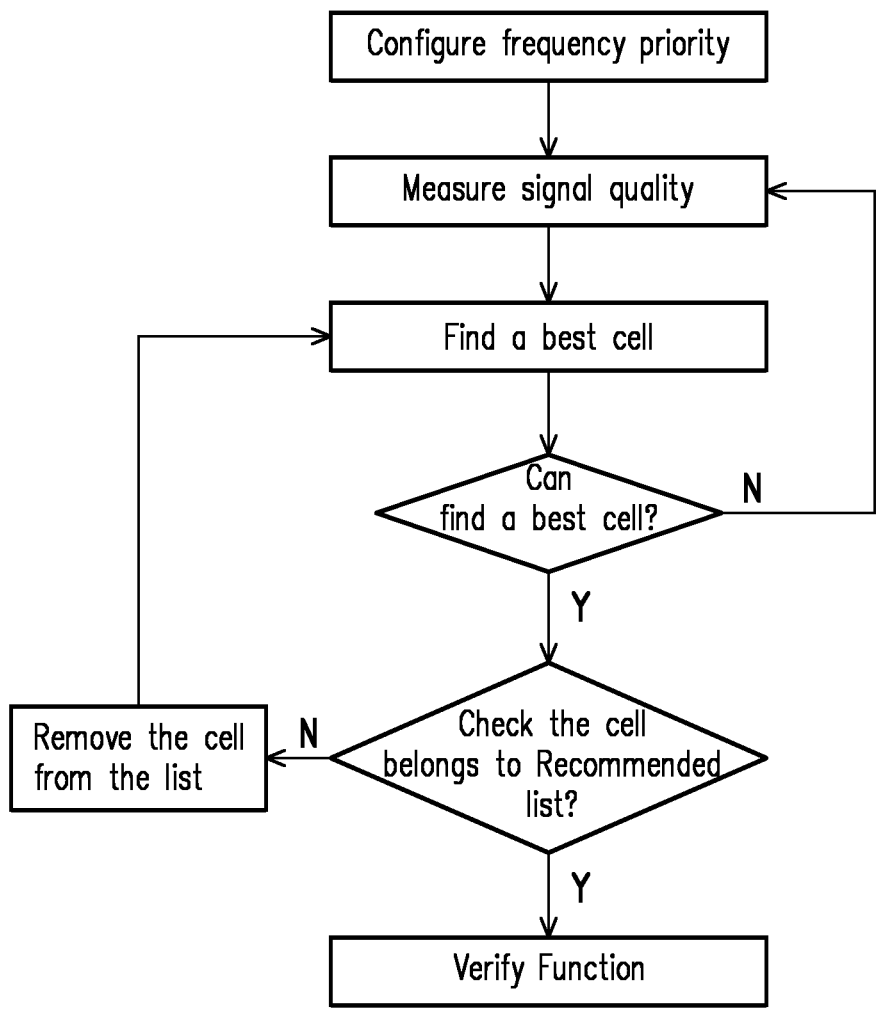
FIG. 11 illustrates a cell re-selection method used by a user equipment in accordance with a fifth exemplary embodiment of the disclosure.

FIG. 11 illustrates a cell re-selection method used by a user equipment in accordance with a fifth exemplary embodiment of the disclosure. The fifth exemplary embodiment shows a procedure of a UE performing a cell re-selection procedure by taking a list of recommended cells configured by network node into consideration. In this procedure, the UE could receive information related to a priority level of each carrier frequency and cell re-selection parameters (e.g. a T timer) from a network node. Based on the information, the UE could perform the advance cell reselection. The UE could set the frequencies of cells in the recommended list of cells with the highest re-selection priority. When the UE measures a cell that satisfies a selection condition (e.g., the cell's criterion S>0), the UE may calculate a criterion R for the cell. The UE may compile a cell list with cells that satisfy the selection condition after measurements. If the UE could not find any cell that satisfies the re-selection condition, the UE may keep performing measurements. Based on the criterion R and re-selection priority, the UE will find a best cell (for example, a cell has the biggest criterion R value, operates on the highest reselection priority frequency, and is not barred) from the compiled cell list. If the UE cannot find a best cell from the cell list, the UE could continue to perform measurements. The UE may check whether the best cell belongs to the recommended cells. If the best cell belongs to the recommended cells, then the UE will verify whether the cell could be connected to by a verify function. If the best cell does not belong to the recommended cells, the UE will remove the cell from the cell list and re-select a best cell from the cell list. The verify function could check the cell status and signaling quality to verify whether the cell could be connected to.

Figure 12:
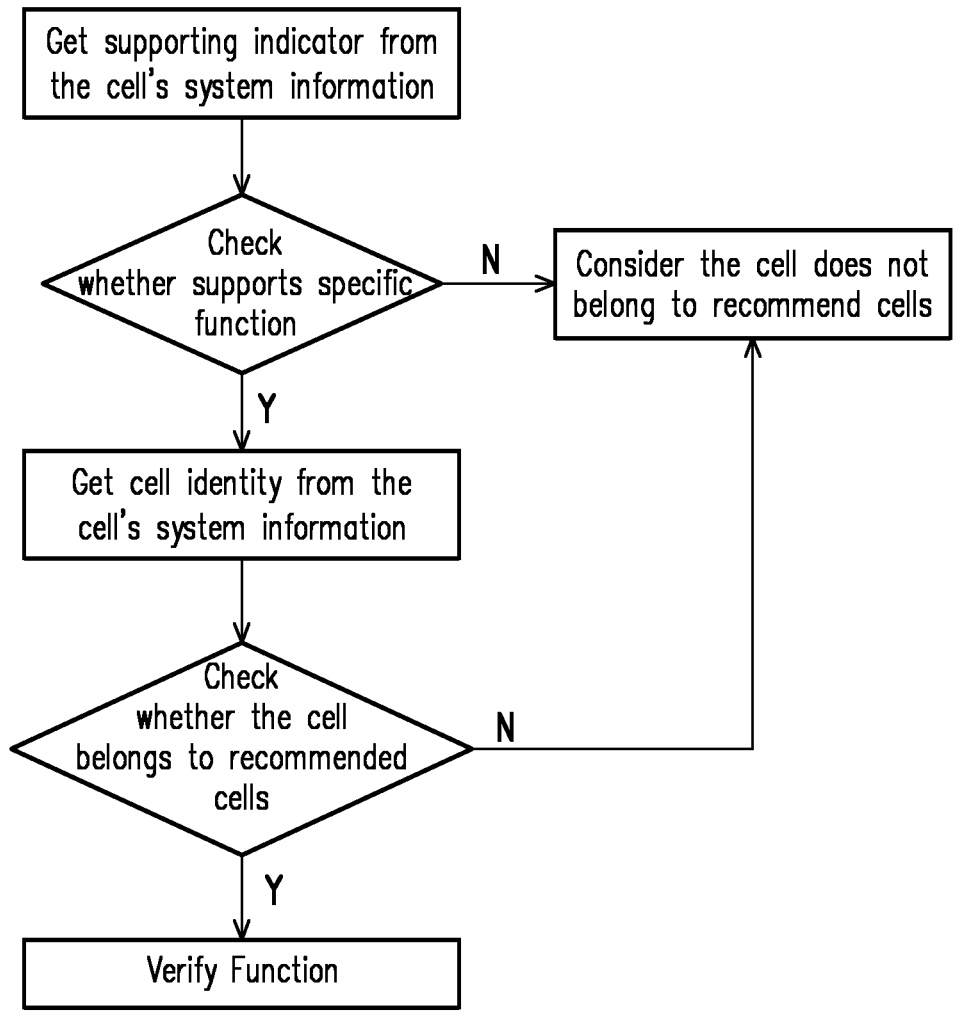
FIG. 12 illustrates a cell re-selection method used by a user equipment in accordance with a sixth exemplary embodiment of the disclosure.

FIG. 12 illustrates a cell re-selection method used by a user equipment in accordance with a sixth exemplary embodiment of the disclosure. The sixth exemplary embodiment shows a procedure of a UE checking whether a cell belongs to a list of recommended cells. The UE could get a supporting indicator from a system information block. The supporting indicator is used by a network node to indicate whether the network node supports one or more specific functions (e.g. lightly connection related function or inactive state related function). If the network node does not provide the supporting indicator, the network node may not support a specific functions (e.g. lightly connection related function or inactive state related function). If the UE could not get the supporting indicator, the UE may consider that the cell does not belongs to the list of recommended cells. If the UE could get the supporting indicator, the UE may further get a cell identity from system information. The UE will use the cell identity to verify whether the cell belongs to recommended cell. If the cell belongs to recommended cell, the UE will verify whether the cell could be connected to by a verify function. The verify function could check the cell status and signaling quality to verify whether the cell could be connected to. If the cell does not belong to the list of recommended cells based on the check of cell identity, then the UE may consider the cell not belonging to the list of recommended cells.

Figure 13:
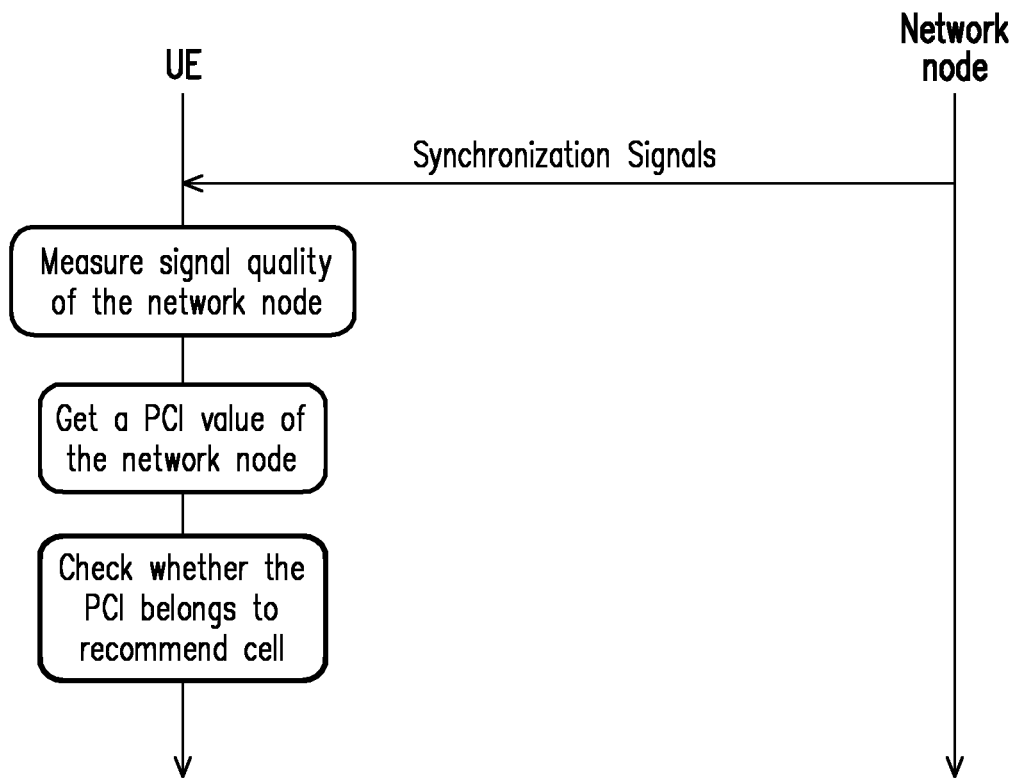
FIG. 13 illustrates a cell re-selection method used by a user equipment in accordance with a seventh exemplary embodiment of the disclosure.

FIG. 13 illustrates a cell re-selection method used by a user equipment in accordance with a seventh exemplary embodiment of the disclosure. The seventh exemplary embodiment shows a procedure of a UE checking whether a cell identity belongs to a list of recommended cells. The UE may obtain a synchronization signals from a network node. Based on the synchronization signals, the UE could measure the signal quality of the network node. The UE could get a Physical Cell Identifier (PCI) value of the network node. The UE could then match the PCI value to the PCI value from the list of recommended cells and verify whether the PCI value belongs to a cell from the list of recommended cells.

Figure 14:
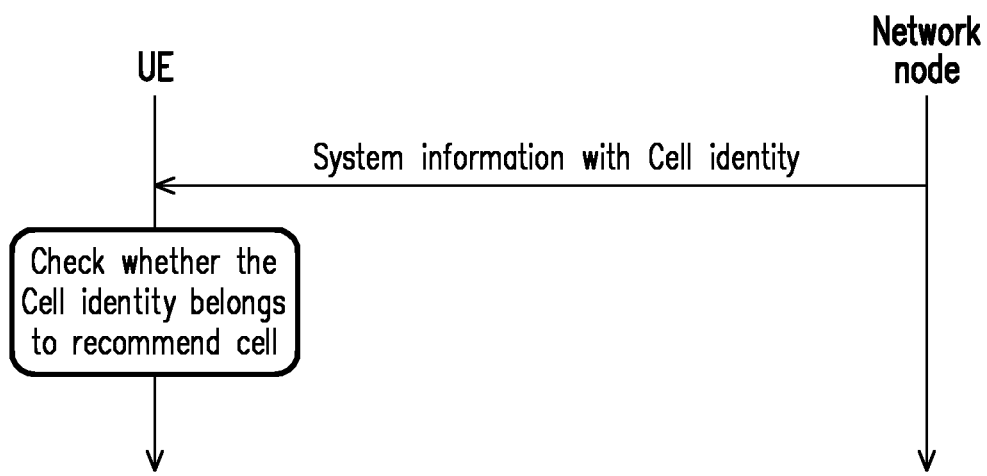
FIG. 14 illustrates a cell re-selection method used by a user equipment in accordance with an eighth exemplary embodiment of the disclosure.

FIG. 14 illustrates a cell re-selection method used by a user equipment in accordance with an eighth exemplary embodiment of the disclosure. The eighth exemplary embodiment shows a procedure of a UE checking a cell identity belongs to a list of recommended cells. The UE could obtain a cell identity from a system information block. The cell identity could be a Cell Global Identity (CGI), a network node code (e.g. paging area code, notification area code, or tracking area code), or a list of area codes. The UE could match the value of the cell identity to the values from the list of recommended cells so as to verify whether the cell identity belongs to the list of recommended cells.

Figure 15:
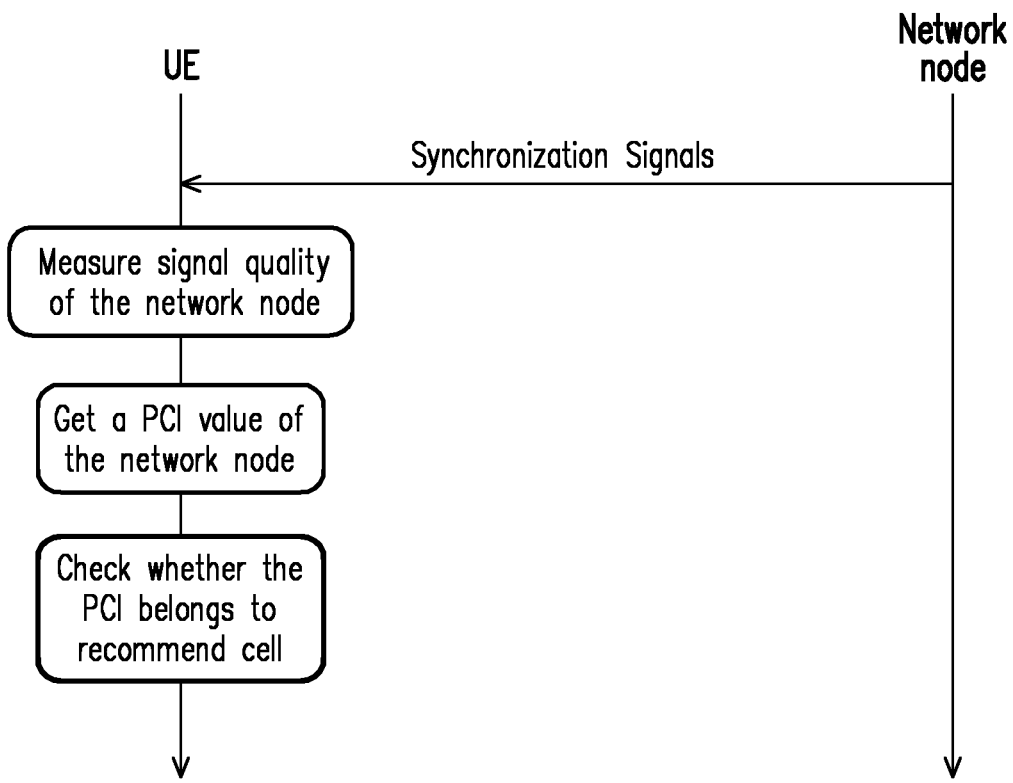
FIG. 15 illustrates a cell re-selection method used by a user equipment in accordance with a ninth exemplary embodiment of the disclosure.

FIG. 15 illustrates a cell re-selection method used by a user equipment in accordance with a ninth exemplary embodiment of the disclosure. The ninth exemplary embodiment shows a procedure of a UE checking whether a cell identity belongs to a list of recommended cells. The UE could obtain a synchronization signals from a network node. Based on the synchronization signal, the UE could measure the signal quality of the network node. The UE could then get a Physical Cell Identifier (PCI) value of the network node. The UE could match the PCI value to the PCI value from the list of recommended cells to verify whether the PCI value belongs to the list of recommended cells.

Figure 16:
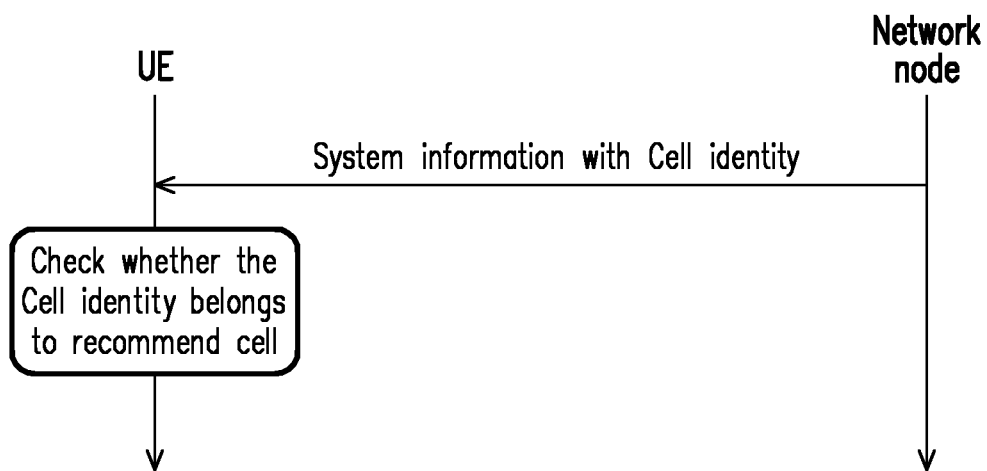
FIG. 16 illustrates a cell re-selection method used by a user equipment in accordance with a tenth exemplary embodiment of the disclosure.

FIG. 16 illustrates a cell re-selection method used by a user equipment in accordance with a tenth exemplary embodiment of the disclosure. The tenth exemplary embodiment shows a procedure of a UE checking whether a cell identity belongs to a list of recommended cells. The UE could obtain a cell identity from a system information block. The cell identity could be at least a Cell Global Identity (CGI), a network node code (e.g. paging area code, notification area code, or tracking area code), or a list of area codes. The UE could match the value of the cell identity value to the value from the list of recommended cells to verify whether the cell identity value belongs to the list of recommended cells.

In view of the aforementioned descriptions, the present disclosure is suitable for being used in a wireless communication system and is able to perform cell re-select by taking network recommendation into consideration.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A cell re-selection method used by a user equipment, and the method comprising:
    obtaining a recommended cell list;
    storing one or more cells nearby the user equipment after performing a signal quality measurement and a cell specific information acquisition;
    establishing a first cell list, wherein the first cell list comprises a signal quality and a cell specific information for each of the cells resulted from the signal quality measurement and the cell specific information acquisition;
    calculating a cell selection criterion value for each of cells in the first cell list based on the signal quality resulted from the signal quality measurement;
    determining whether there is at least one cell that is in both the first cell list and the recommended cell list;
    selecting a second cell from the at least one cell in response to having determined that there is at least one cell that is in both the first cell list and the recommended cell list; and performing cell reselection to the second cell, wherein the second cell is a best cell having a biggest cell selection criterion value while satisfying a selection condition among the first cells,
    wherein determining whether there is at least one cell that is in both the first cell list and the recommended cell list further comprising:
    generating a fourth cell list from the first cell list to contain only one or more cells that are also in the recommended cell list; and
    generating a fifth cell list from the first cell list to contain one or more cells that are in the first cell list but not in the recommended cell list,
    wherein in response to having determined that there is not at least one cell in the fourth cell list, the method further comprising:
    determining whether a signal quality of a current serving cell of the user equipment is greater than a predetermined threshold;
    discarding the first cell list, the fourth cell list and the fifth cell list in response to having determined that the signal quality of the current serving cell of the user equipment is greater than a predetermined threshold; and
    selecting a second cell from the fifth cell list based on the value in response to having determined that the signal quality of the current serving cell of the user equipment is no greater than a predetermined threshold.

2. The method of claim 1, wherein selecting the second cell from the at least one cell in response to having determined that there is at least one cell that is in both the first cell list and the recommended cell list comprising:
    comparing the recommended cell list and the first cell list to generate a third cell list which comprises at least one cell that is in both the recommended cell list and the first sorted cell list; and
    determining the second cell from the third cell list based on the value.

3. The method of claim 2, wherein in response to having determined that there is no cell that is in both the first sorted cell list and the recommended cell list, claim 2 further comprising:
    determining whether the signal quality of a current serving cell of the user equipment is greater than a predetermined threshold;
    discarding the first list in response to having determined that the signal quality of a current serving cell of the user equipment is greater than a predetermined threshold; and
    selecting the second cell based on the value from the first cell list in response to having determined that the signal quality of the current serving cell of the user equipment is no greater than a predetermined threshold.

4. The method of claim 1, the cell specific information of the one or more cells comprise at least one of a Physical layer Cell Identity (PCI), a Cell Global Identifier, a Cell Identifier (ID), an area code, and a supported service information identity.

5. The method of claim 1, wherein performing cell reselection to the second cell comprising:
    determining whether the second cell can be reselected to based on a signal quality condition of the second cell and a status of the second cell; and
    reselecting to the second cell in response to having determined that the second cell can be reselected to.

6. The method of claim 1, wherein the recommended cell list is one of a list of cell identifiers (IDs), a list of codes, and a list of service IDs.

7. The method of claim 1 wherein determining whether there is at least one cell that is in both the first cell list and the recommended cell list is by
    determining whether the cell specific information matches the recommended cell list.

8. A user equipment comprising:
    a transceiver; and
    a processor coupled to the transceiver and configured to:
        obtain a recommended cell list;
        store one or more cells nearby the user equipment after performing a signal quality measurement and a cell specific information acquisition,
        establish a first cell list, wherein the first cell list comprises a signal quality and a cell specific information for each of the cells resulted from the signal quality measurement and the cell specific information acquisition;
        calculate a cell selection criterion value for each of cells in the first cell list based on the signal quality resulted from the signal quality measurement;
        determine whether there is at least one cell that is in both the first cell list and the recommended cell list;

select a second cell from the at least one cell in response to having determined that there is at least one cell that is in both the first cell list and the recommended cell list; and;

perform cell reselection to the second cell, wherein the second cell is a best cell having a biggest cell selection criterion value while satisfying a selection condition among the first cells, wherein the processor is further configured to:

generate a fourth cell list from the first cell list to contain only one or more cells that are also in the recommended cell list; and generate a fifth cell list from the first cell list to contain one or more cells that are in the first cell list but not in the recommended cell list, wherein in response to having determined that there is not at least one cell in the fourth cell list, the processor is further configured to:

determine whether a signal quality of a current serving cell of the user equipment is greater than a predetermined threshold;

discard the first cell list, the fourth cell list and the fifth cell list in response to having determined that the signal quality of the current serving cell of the user equipment is greater than a predetermined threshold; and select a second cell from the fifth cell list based on the value in response to having determined that the signal quality of the current serving cell of the user equipment is no greater than a predetermined threshold.

\* \* \* \* \*